United States Patent Office 3,245,451
Patented Apr. 12, 1966

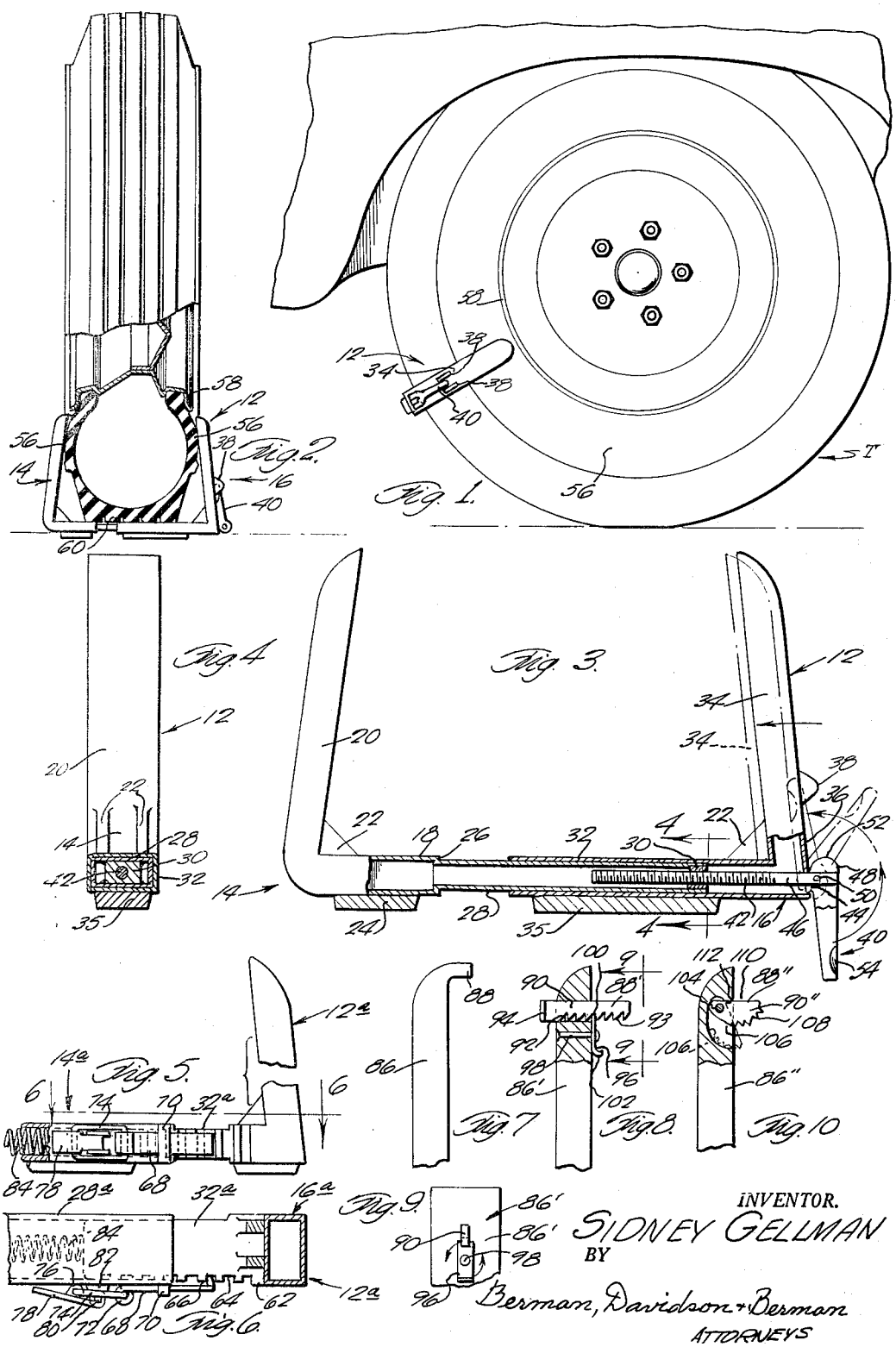

3,245,451
CLAMP TYPE TRACTION DEVICES
Sidney Gellman, 86 Farrell St., Long Beach, N.Y.
Filed Jan. 19, 1965, Ser. No. 426,591
6 Claims. (Cl. 152—225)

This invention relates to clamp type traction devices for pneumatic tired vehicle drive wheels for use in slush, snow, or mud.

The primary object of the invention is the provision of simpler, more efficient, and more reliable devices of the kind indicated, whose tire gripping members make holding contacts with the parts of the sidewalls of a tire which are located close to the rim on which the tire is mounted, these parts of the sidewalls being subject to relatively minor flexures, under operating conditions, so that flattening and widening of the tire, under service conditions, does not act to dislodge the devices and permit the same to slide around the tire, to the detriment of the devices' traction performance, and damage the tire.

Another object of the invention is the provision of devices of the character indicated above, which have transverse traction members upon which the treads of tires bear constantly, whether the tires are of normal cross section and are flattened and widened, under service conditions, so that a tendency for the device to be pulled radially off tires is minimized or substantially reduced.

In the drawings:

FIGURE 1 is a side elevation showing a device of the invention applied to a pneumatic tire;

FIGURE 2 is a transverse section taken through the tire of FIGURE 1, along one side of the device;

FIGURE 3 is an enlarged side elevation of said device, partly broken away and in section, and showing the cam latch in open position, in full lines, and in intermediate and closed positions, in phantom lines;

FIGURE 4 is a vertical section taken on the line 4—4 of FIGURE 3;

FIGURE 5 is a contracted and fragmentary elevation of another form of device of the invention, parts being broken away and in section;

FIGURE 6 is a horizontal section taken on the line 6—6 of FIGURE 5;

FIGURE 7 is a fragmentary side elevation of a variation of a tire gripping arm;

FIGURE 8 is a side elevation of another variation of a tire gripping arm, partly broken away and in section;

FIGURE 9 is an inside elevation taken on the line 9—9 of FIGURE 8; and,

FIGURE 10 is a side elevation of a further variation of tire gripping arm, partly broken away and in section.

Referring in detail to the drawings, and first to FIGURES 1 to 4 thereof, the device 12 therein shown comprises a generally U-shaped clamp body, comprising a relatively stationary section 14, and a movable section 16.

The stationary section 14 comprises a flat rectangular cross section base portion 18, on whose outer end is formed an upwardly and inwardly angled tire gripping arm 20, which is braced to the base section 18, by means of a gusset plate 22. A flat resilient and compressible traction pad 24 is suitably secured to the underside of the base portion 18, near the outer end thereof.

The base portion 18 is reduced in cross section, to form a shoulder 26, located near the inner end of the pad 24, and a relatively long reduced cross section inner end portion 28. A nut 30 is suitably secured in the otherwise open inner end of the reduced portion 28.

The movable section 16 of the clamp body comprises a flat rectangular tubular base portion 32, which is slidably engaged over the reduced portion 28. An upwardly and inwardly angled tire gripping arm 34, similar to the gripping arm 20 of the stationary section 14, is formed on the outer end of the base portion 32. A relatively long resilient traction pad 35 is suitably secured to the underside of the base portion 32.

The outer wall 36 of the gripping arm 34 is formed, at its lower end, with a pair of vertical laterally spaced outstanding ribs 38, between which a cam latch 40 is adapted to seat, in the closed position of the latch.

A clamping frame width-adjusting screw 42 extends inwardly through a journal opening 44, formed in the outer wall 36, which is registered with the bore of the nut 30, and the screw is threaded through the nut. The screw 42 has a smooth outer end portion 46, which is slidably journaled through the opening 44.

The cam latch 40 has a clevis 48, on its lower end, which straddles the outer end of the screw 42, and is pivoted thereto, as indicated at 50. As shown in FIGURE 3, the latch 40 has an eccentrically rounded cam nose 52, on its lower end, which, in the closed position of the latch, shown in phantom lines in FIGURE 3, bears against the outer wall 36 of the gripping arm 34, between the ribs 38. The inner edge of the latch 40 on one side thereof, is preferably formed with a recess 54, into which a suitable implement (not shown) is adapted to be engaged and turned on a rib 38, for opening the latch.

In operation, with the latch 40 in open position, the same is rotated in a direction to move the movable section 16, relative to the stationary section 14, into spaced relations of their gripping arms which accept the tire T, at any place around the circumference of the tire. The device is then engaged radially on the tire, as shown in FIGURE 1, the cam latch rotated, in the opposite direction, so as to engage the outer end portions or tips of the gripping arm, with the parts of the tire sidewall 56 adjacent to the tire rim 58, with the cross member of the clamp frame engaged with the tread 60 of the tire. The cam latch is then swung over-center against the outer wall 36 of the arm 34 of the movable section 16.

As shown in FIGURE 2, major portions of the gripping arms, below the points of contact of the tips of these arms with the tire sidewalls, are spaced from and out of contact with the tire sidewalls, so that, in service conditions, the tire is free to flatten and expand without undesirably contacting these major portions and loosening the device on the tire.

The type of device 12a show in FIGURES 5 and 6, differs from that shown in FIGURES 1 to 4, in that the screw 42 and the cam latch 40 are replaced with a different form of adjustable clamping and retaining means.

A side wall 62 of the base portion 32a of the movable section 16a is provided with a row of longitudinally spaced vertical notches 64, in which a lateral detent 66, on the adjacent end of a latch plate 68 is selectively engageable for locking the sections in clamped condition on a tire. The latch plate 68 is slidably guided through a loop 70 on the adjacent sidewall of the base section portion 28a of the stationary section 16, and is formed with a tubular barrel 72 on its other end. One end of a rectangular ring 74 is journaled through the barrel 72, and its other end is journaled through an eye 76 on the inward side of an over-center latch lever 78. The lever is pivoted, as indicated at 80, at its rear end, on a lateral lug 82 on the adjacent side wall of the base section portion 28a of the stationary section 14a. A coil spring 84, within the base portion 28a is in tension between the outer end of the base portion 28a and the inner end of the base portion 32a of the movable section 16a. The spring 84 serves to urge the movable section 16a toward the stationary section 14a, and is connected thereto, so that the movable section is captive to the stationary section.

In operation, the latch lever 78 having been pivoted over-center away from the base section 28a, the latch plate 68 is freed to be moved endwise and laterally outwardly, so that the detent 66 is removable from the notches 64, and selectively replaced therein. In order to clamp the device 12a on a tire, the sections 14a and 16a are pulled apart against the resistance of the spring 84, and the latch engaged, so as to keep the sections spaced to the desired degree for application to a tire. When applied to the tire the latch is disengaged, so that the spring 84 can forcibly engage the sections with the sides of the tire. The detent is then engaged in a selected one of the notches 64, and the latch lever swung over-center toward the base portion 28a, as shown in FIGURE 6, so that the sections are further clamped against the tire sidewalls, and locked together.

The variation of a gripping arm 86 shown in FIGURE 7, serves the same purposes as the gripping arms of FIGURES 1 to 6. The arm 86 is disposed at right angles to the base portions of the related device, and has, on its upper end, a laterally inwardly extending fixed tip 88, which is adapted to engage the parts of the tire sidewalls adjacent to the tire rim, and space the remainder of the arm 86 from the remainder of the tire sidewalls.

Another variation of gripping arm 86′ is shown in FIGURES 8 and 9, wherein the tire engaging tip 88′ is adjustable. The tip 88′ comprises a flat bar 90 sliding through a rectangular bore 92, formed in the upper part of the arm 86′, and provided, on its lower edge, with ratchet teeth 93. A laterally operating handle 94 is provided on the outer end of the bar 90. A spring ratchet dog 96 is pivotally fixed, intermediate its ends, as indicated at 98, to the inner side of the arm 86′, below the bar 90, and has an upper edge 100 engaged with the ratchet teeth, and a lateral handle flange 102, on its lower end.

In order to retract the ratchet bar 90, the ratchet dog 96 is rotated so as to clear the ratchet teeth 93 and free the bar to be pulled outwardly. Inward adjustment of the ratchet bar is effected with the ratchet dog engaged with its teeth, so that on retaining proper contact of the inner end of the ratchet bar with the tire, the ratchet dog holds the position of the ratchet bar.

A further variation of gripping arm 86″ is shown in FIGURE 10, wherein the tip 88″ comprises a segmental-shaped plate 90″, pivoted at one end thereof, as indicated at 104, within a recess 106, formed in the inner side of the arm 86″, and adapted to receive the plate 90″, when the latter is in depressed inoperative position, as shown in phantom lines in FIGURE 10.

The outer part of the arcuate edge 106 of the tip plate 90″ is formed with teeth 108, adapted to engage the side of a tire, and the straight edge 110 of the plate 90″ engaged with the upper end 112 of the recess 106, as shown in full lines in FIGURE 10.

What is claimed is:

1. In combination, a tire rim, a pneumatic tire seated in the rim, said tire having convex sidewalls and a tread, said sidewalls having contact areas adjacent to the rim and located between the bulges of the sidewalls and the rim, a traction device comprising a frame having a cross-member engaged with the tire tread, and gripping arms on the cross-member having tips at their free ends forcibly-engaged with said contact areas, the remainders of the gripping arms being laterally-spaced from the tire sidewalls, said gripping arms being disposed at right angles to the cross member and having laterally inwardly extending tips at their free ends, said tips being adjustable relative to the gripping arms, said arms being formed with transverse bores, said tips comprising ratchet plates sliding through the bore, and spring ratchet dogs pivoted on the inward sides of the arms, said ratchet dogs having upper ends normally engaged with the teeth of the ratchet plates.

2. In combination, a tire rim, a pneumatic tire seated in the rim, said tire having convex sidewalls and a tread, said sidewalls having contact areas adjacent to the rim and located between the bulges of the sidewalls and the rim, a traction device comprising a frame having a cross-member engaged with the tire tread, and gripping arms on the cross-member having tips at their free ends forcibly-engaged with said contact areas, the remainders of the gripping arms being laterally-spaced from the tire sidewalls, said gripping arms being disposed at right angles to the cross-member and having laterally inwardly extending tips at their free ends, said tips being adjustable relative to the gripping arms, the gripping arms being disposed at right angles to the cross member and being formed with recesses in their inward sides, said tips comprising segmental plates pivoted at their inner ends in the recesses, said recesses having upper ends, said segmental plates having straight edges adapted to engage the upper ends of the recesses in the elevated operative positions of the plates, said plates having arcuate edges formed with tire sidewall engaging teeth.

3. A traction device comprising a generally U-shaped clamping frame, said frame comprising a relatively stationary section and a movable section, said stationary section comprising a base portion having a lateral tire sidewall gripping arm on its outer end, said movable section comprising a base portion slidably-confined on the base portion of the stationary section for relatively endwise movements, and adjustable-clamping means associated with the said base portions, said clamping means comprising a nut fixed on the base portion of the stationary section, a screw threaded through said nut, said screw having a smooth outer end portion slidably and rotatably journaled through a part of the base portion of the movable section, an over-center cam latch pivoted on said smooth portion, said latch having a cam nose adapted to bear against a part of the movable section in a closed position of the latch, said latch in its open position being free from said part and adapted to be rotated to rotate the screw for moving the sections toward each other and for moving the sections away from each other.

4. A traction device according to claim 3, wherein said base portions are of rectangular tubular cross-section and are telescopically and slidably engaged with each other, said nut being fixed with the base portion of the stationary section, and the screw being disposed within the base portion of the movable section.

5. A traction device comprising a generally U-shaped clamping frame, said frame comprising a relative stationary section and a movable section, said stationary section comprising a base portion having a lateral tire sidewall gripping arm on its outer end, said movable section comprising a base portion slidably-confined on the base portion of the stationary section for relative endwise movements, and adjustable-clamping means associated with the said base portions, said clamping means comprising a coil spring in tension between the outer end of the base portion of the stationary section and the inner end of the base portion of the movable section, a side of the base portion of the movable section being formed with adjustment notches, and over-center latch means mounted on the base portion of the stationary section, said latch means comprising a lateral detent engageable in selected ones of said notches in the open position of the latch means.

6. A traction device according to claim 5 wherein said latch means comprises in addition a latch plate slidably-mounted on the base portion of the stationary section, said detent being on the end of the latch plate adjacent to the movable section, a ring journaled at one side thereof on the other end of the latch plate, a latch lever pivoted at one end on the base portion of the stationary section, the other end of the ring being pivoted to the latch lever at the inner side of the latch lever and at a point intermediate the ends of the latch lever.

References Cited by the Examiner
UNITED STATES PATENTS

| | | | |
|---|---|---|---|
| 1,256,729 | 2/1918 | Reese | 152—225 |
| 1,525,779 | 2/1925 | King | 152—225 |
| 1,858,412 | 5/1932 | Neumann | 152—225 |
| 2,612,202 | 9/1952 | Bumbaugh | 152—225 |
| 2,692,632 | 10/1954 | Snedeker | 152—225 |
| 3,103,242 | 9/1963 | Culp | 152—225 |

ARTHUR L. LA POINT, *Primary Examiner.*

C. W. HAEFELE, *Assistant Examiner.*